(12) United States Patent
Reisner

(10) Patent No.: US 9,387,838 B2
(45) Date of Patent: Jul. 12, 2016

(54) VEHICLE BRAKING APPARATUS SYSTEM AND METHOD

(75) Inventor: Ronald Christopher Reisner, Ballston Spa, NY (US)

(73) Assignee: KRAYON SYSTEMS INC., Ballston Spa, NY (US)

( * ) Notice: Subject to any disclaimer, the term of this patent is extended or adjusted under 35 U.S.C. 154(b) by 1465 days.

(21) Appl. No.: 11/403,216

(22) Filed: Apr. 12, 2006

(65) Prior Publication Data

US 2007/0250240 A1 Oct. 25, 2007

(51) Int. Cl.
*B60T 7/18* (2006.01)
*B62D 1/28* (2006.01)
*G05D 1/02* (2006.01)

(52) U.S. Cl.
CPC ... *B60T 7/18* (2013.01); *B62D 1/28* (2013.01); *G05D 1/0265* (2013.01)

(58) Field of Classification Search
CPC ... G05D 1/0265; G05D 1/0061; G05D 1/021; G05D 1/0212
USPC .......... 180/167–169; 246/182 B, 202; 701/2, 701/70, 117, 300; 340/435, 436
See application file for complete search history.

(56) References Cited

U.S. PATENT DOCUMENTS

| | | | |
|---|---|---|---|
| 1,685,480 A | 9/1928 | Clark | |
| 1,846,032 A | 2/1932 | Hart | |
| 2,493,755 A | 1/1950 | Ferrill, Jr. | |
| 3,085,646 A * | 4/1963 | Paufve | 180/168 |
| 3,149,691 A | 9/1964 | Snell et al. | |
| 3,569,969 A | 3/1971 | Lemon, Jr. | |
| 3,575,255 A | 4/1971 | Wickstrom | |
| 3,653,456 A | 4/1972 | Uemura | |
| 3,736,484 A * | 5/1973 | Reynolds et al. | 318/587 |
| 4,079,322 A | 3/1978 | Lawrence et al. | |
| 4,833,469 A | 5/1989 | David | |
| 5,420,580 A | 5/1995 | Rawls | |
| 5,913,375 A * | 6/1999 | Nishikawa | 180/168 |
| 5,987,374 A * | 11/1999 | Akutsu et al. | 701/117 |
| 6,370,475 B1 * | 4/2002 | Breed et al. | 701/301 |
| 6,772,062 B2 * | 8/2004 | Lasky et al. | 701/207 |
| 6,864,804 B1 * | 3/2005 | Allen et al. | 340/933 |
| 2004/0111207 A1 * | 6/2004 | Weed et al. | 701/70 |
| 2004/0158366 A1 * | 8/2004 | Dieterle | 701/23 |
| 2004/0193363 A1 * | 9/2004 | Schmidt et al. | 701/200 |
| 2005/0104745 A1 * | 5/2005 | Bachelder et al. | 340/906 |
| 2005/0125153 A1 * | 6/2005 | Matsumoto et al. | 701/300 |
| 2005/0128063 A1 * | 6/2005 | Isaji et al. | 340/439 |
| 2005/0228588 A1 * | 10/2005 | Braeuchle et al. | 701/301 |
| 2006/0280261 A1 * | 12/2006 | Prikhodko et al. | 375/297 |

* cited by examiner

*Primary Examiner* — J. Allen Shriver, II
*Assistant Examiner* — Erez Gurari
(74) *Attorney, Agent, or Firm* — Schmeiser, Olsen & Watts, LLP

(57) ABSTRACT

A vehicle braking apparatus, system and method is provided including electromagnetic signals emitted from an electromagnetic loop positioned on or under a roadway, wherein the signals emitted from the electromagnetic loop correspond to the status of a traffic control zone. The braking apparatus receives signals emitted by the loop and interprets the signals to facilitate remotely directed operation of a brake. A manual actuator is also configured to operate the brake and override remote braking directives.

12 Claims, 3 Drawing Sheets

VEHICLE BRAKING APPARATUS SYSTEM AND METHOD

BACKGROUND OF INVENTION

1. Technical Field

This invention relates generally to the field of vehicle braking. More particularly, this invention provides for an apparatus system and method for reducing the speed of a vehicle entering a traffic control zone, utilizing remote activation of the vehicle breaking system.

2. Related Art

Automobiles and other road vehicles provide convenient and efficient transportation capability pertinent to both persons and things. Globally, the demographic of societies is tending toward urbanization. According to a recent U.S. Census, three-fourths of the U.S. population lived in metropolitan areas. Moreover, the majority of the nation's population growth during the next 25 years is predicted to be in metropolitan areas. In addition, the number of vehicle miles traveled is also increasing rapidly, especially in urban areas. For example, in the U.S. from 1980-1999, the total percentage of vehicle miles traveled rose 76 percent, while miles traveled in urban areas grew 90 percent. However, as more vehicles travel more miles on the roads, the probability of vehicular accidents continues to increase. For example, vehicular accidents are a significant cause of death and injury in the United States. Typically, crashes that cause injuries and/or property damage occur at the highest rates in urban areas; but, fatal crashes are more likely to occur in rural areas where higher vehicle speeds are more frequently attained. Pedestrian deaths and injuries are most prevalent in urban areas.

Many vehicular accidents occur within or near a traffic control zone. For example, accidents commonly occur at or near intersections having traffic control signals or signs. Moreover, accidents may occur in control zones where vehicular speed is directed to be reduced, such as school zones, near shopping malls, around sports venues and construction zones. To help reduce the number of accidents within or near traffic control zones, various braking apparatus, systems and methods have been provided. The typical vehicle braking apparatus, systems and methods may include vehicle sensing components to help determine vehicle speed and location. Moreover, common braking apparatus, systems and methods may determine whether vehicle speed and/or location is unsafe. Furthermore, familiar vehicle braking apparatus, systems and methods may remotely activate vehicle brakes if the vehicle speed and/or location is determined to be unsafe. However, common vehicle braking apparatus, systems and methods utilize component elements that are costly and cumbersome to install and/or use. In addition, common vehicle braking apparatus, systems and methods involve inefficient structural configurations and/or hazardous braking functionality. Still further, known vehicle braking systems are ineffective in determining and stopping unsafe vehicles within or near a traffic control zone.

Accordingly, there is a need in the field of vehicle braking for an improved apparatus system and method for stopping a vehicle entering a traffic control zone, utilizing remote activation of the vehicle breaking system.

SUMMARY OF INVENTION

The present invention provides an apparatus system and method of vehicle braking that offers improved structural configuration, functional operability and reliability.

A first general aspect of the invention provides a vehicle braking apparatus comprising: a receiver, configured to receive electromagnetic signals emitted from an electromagnetic loop positioned on or under a roadway, wherein the signals emitted from the electromagnetic loop correspond to the status of a traffic control zone; a processor, communicatively linked to the receiver, wherein the processor includes governing protocol executable for interpreting signals received by the receiver; a brake, wherein the brake is configured to operate as directed by the processor; and a manual actuator, configured to operate the brake and override braking directives provided by the processor.

A second general aspect of the invention provides a vehicle braking method comprising: providing an electromagnetic loop, wherein the electromagnetic loop is located on or under a roadway; detecting a vehicle, wherein the vehicle is detected via electromagnetic variance in the electromagnetic loop as the vehicle electromagnetically interacts with the loop; providing a traffic control device, wherein the traffic control device is configured to calculate the position and velocity of the detected vehicle in relation to the status of a traffic control zone and to determine whether the condition of the vehicle, as detected in relation to the status of the traffic control zone, is safe; transmitting braking signals from the electromagnetic loop, wherein the braking signals are initiated by the traffic control device if the condition of the vehicle is determined to be unsafe; and receiving the signals, by the vehicle, to remotely initiate braking of the vehicle.

A third general aspect of the invention provides a vehicle braking system comprising: an electromagnetic loop positioned on or under a roadway, wherein the electromagnetic loop is configured to detect a vehicle electromagnetically interacting with the loop and to transmit electromagnetic braking signals to the vehicle; a traffic control device communicatively linked to the electromagnetic loop, wherein the traffic control device is configured to calculate the position and velocity of the detected vehicle in relation to the status of a traffic control zone and to determine whether the condition of the vehicle, as detected in relation to the status of the traffic control zone, is safe; a braking apparatus operably located on the vehicle, wherein the braking apparatus receives braking signals transmitted by the loop and interprets the signals to facilitate remotely directed operation of a brake; and a manual actuator, configured to operate the brake and override remote braking directives.

The foregoing and other features of the invention will be apparent from the following more particular description of various embodiments of the invention.

BRIEF DESCRIPTION OF THE DRAWINGS

Some of the embodiments of this invention will be described in detail, with reference to the following figures, wherein like designations denote like members, wherein.

DETAILED DESCRIPTION OF THE INVENTION

Figure 1:
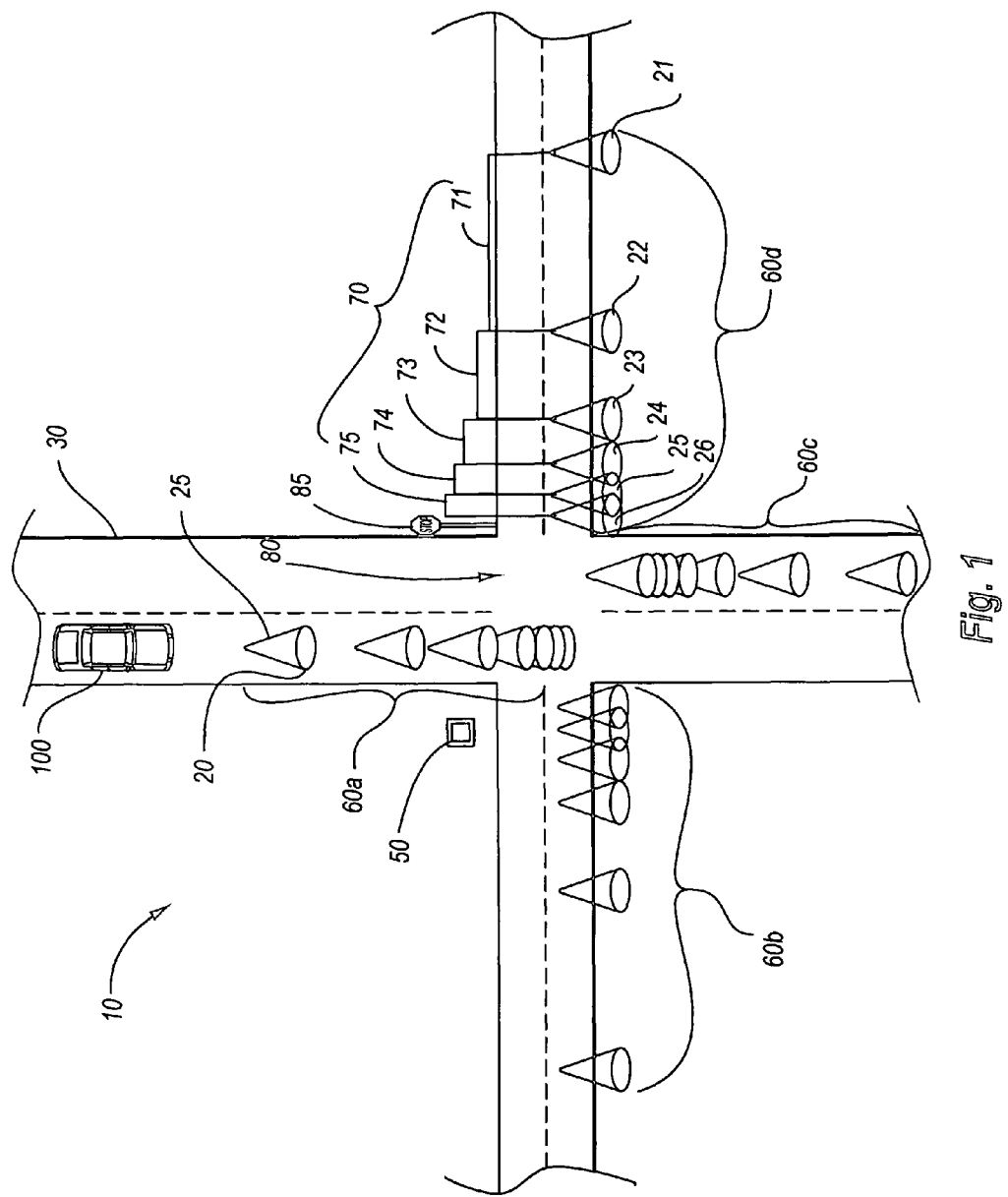
FIG. 1 depicts a top view of an embodiment of a vehicle braking system, in accordance with the present invention.

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, communication techniques, etc., and are disclosed simply as an example of an embodiment. The features and advantages of the present invention are illustrated in detail in the accompanying drawings, wherein like reference numerals refer to like elements throughout the drawings.

As a preface to the detailed description, it should be noted that, as used in this specification and the appended claims, the singular forms "a", "an" and "the" include plural referents, unless the context clearly dictates otherwise.

Referring to the drawings, FIG. 1 depicts a top view of an embodiment of a vehicle braking system 10, in accordance with the present invention. As depicted, the size, and location of various component elements of the braking system 10 are not to scale, but are rather depicted to illustrate in a general sense, the configuration of a braking system 10. The vehicle braking system 10 may include a an electromagnetic loop 50 positioned on or under a roadway 30. Moreover, the vehicle braking system may include a traffic control device 50. The electromagnetic loop 20 may be configured to detect a vehicle 100. For example, the electromagnetic loop 20 may be an inductive loop commonly used for detection of vehicles at demand-actuated traffic signals, wherein the traffic control device 50 of a demand-actuated traffic signal light may sense the presence of a vehicle 100 before changing signals phases in order to optimize traffic flow along a roadway, such as roadway 30. Where the electromagnetic loop 20 is an inductive loop, it may operate by sensing disturbances to the electromagnetic field pertinent to a coil of wire positioned on top of or under the roadway. For example, when a conductive object (typically made of metal), such as a vehicle 100, enters the area over the wire loop, a magnetic field, possibly generated by alternating electrical current in a signal detector circuit of the traffic control device 50, may induce a weak electrical current in the conductive object, such as vehicle 100. (The AC frequency may be between 1000-1,000,000 HZ, typically around 20,000-30,000 HZ.) The electrical currents possibly induced in the conductive object, such as a vehicle 100, may generate their own magnetic field that may work in opposition to the magnetic field generated by the sensor coil operable with the traffic control device 50 (due to Lenz's Law). This opposition may change the resonant frequency of the sensor circuit of the traffic control device 50 by reducing the effective inductance of the wire coil. This possible change in resonant frequency (an increase in frequency as inductance decreases) may be detected by the circuit instrumentation and/or governing software of the traffic control device 50 which may interpret the detection to determine that a conductive object, such as vehicle 100, is present. Accordingly, vehicle 100 detection by the electromagnetic loop 20 may involve via electromagnetic variance due to electromagnetic interaction of the vehicle 100 with the loop 20.

Referring further to FIG. 1, the vehicle braking system 10 may operate relative to a traffic control zone, such as traffic control zones 60a-d. Those in the art will appreciate that a traffic control zone 60 is a physical region wherein vehicular traffic is directed to be altered. Typically, vehicles, such as vehicle 100, are directed to reduce speed and/or stop when the vehicles, such as vehicle 100, encounter the zone 60. For example, vehicles approaching an intersection, such as intersection 80, are often times directed to slow down and/or stop. Direction to slow and/or stop may be communicated to a vehicle operator through road signs, such as stop sign 85. However, those in the art should recognize that various road signs, traffic signals, or other implements such as flagmen, may be provided to direct vehicular traffic encountering a traffic control zone to alter current vehicle condition. For instance, a speed limit sign near a shopping mall may indicate that vehicles, such as vehicle 100 should change speed accordingly. Other traffic control zones 60, may include, but are not limited to, school zones, sports venues, and construction zones.

However, often vehicle operators fail to recognize or heed directions to alter vehicle conditions when, or as, the vehicle approaches and/or encounters a traffic control zone. Unaltered vehicle condition may lead to greater probability for vehicular accidents. Therefore, to assist in facilitating proper vehicular behavior, an electromagnetic loop, such as loop 20, may be configured to transmit electromagnetic braking signals, such as signal 29, to a vehicle, such as vehicle 100. Moreover, the vehicle braking system 10 may comprise a plurality of electromagnetic loops independently linked to the traffic control device 50. Each loop, such as loop 20, of the plurality of loops may be configured to detect a vehicle and transmit signals to a vehicle, such as vehicle 100. Furthermore, multiple electromagnetic loops may be positioned sequentially 70 closer to one another on or below a roadway as the distance to a desired slowing or stopping point is approached. For example, a loop 21, located farthest from a desired stopping point, such as intersection 80, may be positioned a distance 71 away from a sequential loop 22, located closer to the intersection 80. This sequential positioning may continue, wherein in further loops, such as loops 23-26 are positioned closer distances 72-75 away from each other as the distance to the stopping or slowing point, such as intersection 80 is decreased. The signals, such as signal 29 emitted from loop 20, may be radio frequency (RF) signals, or other electromagnetic signals such as infrared (IR) signals.

Figure 2:
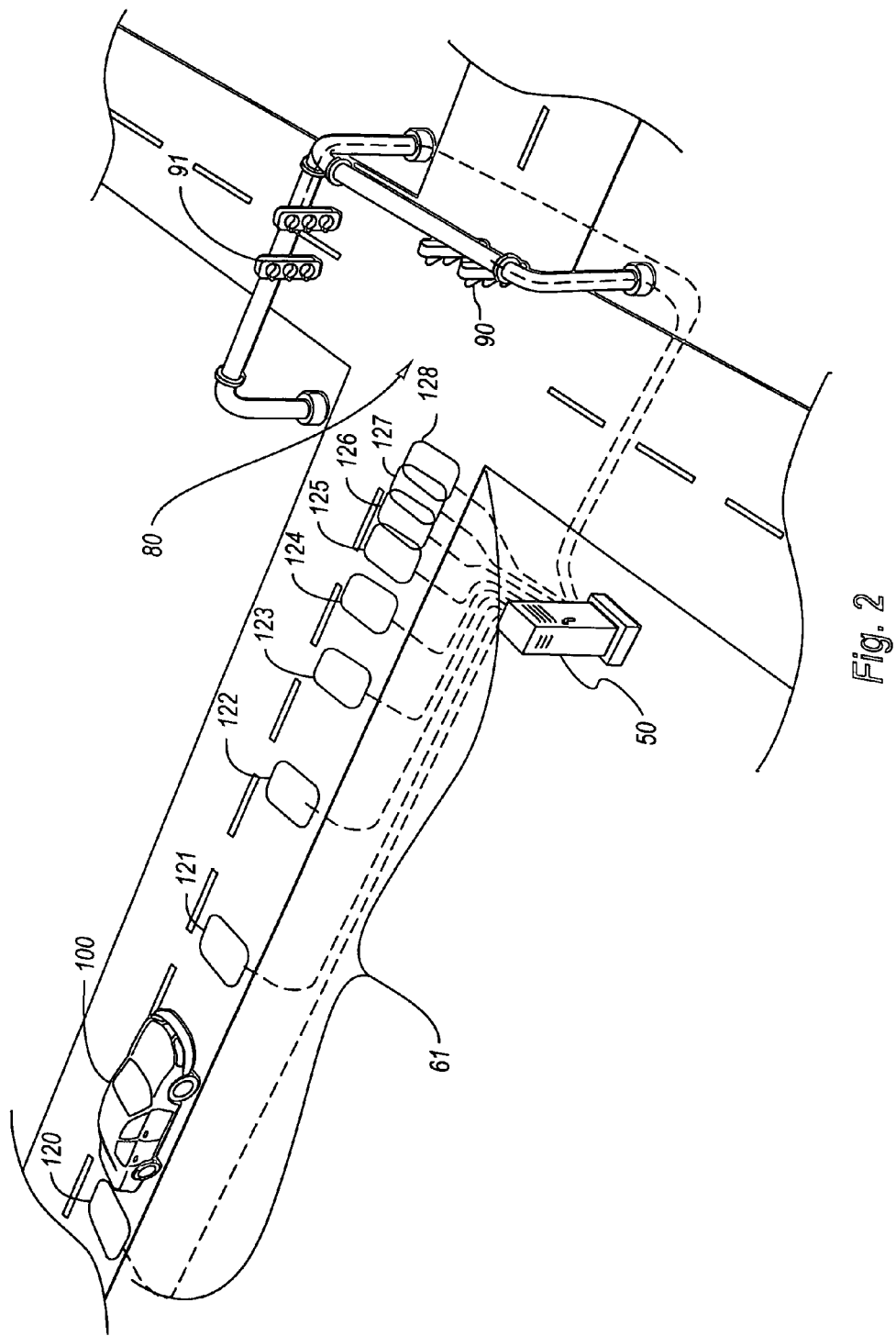
FIG. 2 depicts a perspective view of an embodiment of a vehicle braking system, in accordance with the present invention.

With continued reference to the drawings, FIG. 2 depicts a perspective view of an embodiment of a vehicle braking system 12, in accordance with the present invention. The vehicle braking system 12 may include a traffic control device 50. The traffic control device may be a traffic signal device configured to detect vehicles, such as vehicle 100. Moreover, the traffic control device 50 may be communicatively linked to an electromagnetic loop, such as any of loops 120-128, wherein, as depicted, the communicative link may be illustrated by a dashed line. Furthermore, the traffic control device 50 may be configured to calculate the position and/or velocity of the detected vehicle 100 in relation to the status of a traffic control zone 61. Still further, the traffic control device may determine whether the condition of the vehicle 100, as detected in relation to the status of the traffic control zone 61, is safe. For example, each sensing electromagnetic loop, such as loops 120-128, may be positioned sequentially relative to a posted speed relative to the traffic control zone, such that a vehicle 100 encountering the control zone 60 may decelerate predictably. A vehicle 100, in a condition such that its velocity exceeds the posted speed limit when encountering the traffic control zone 61 may be considered unsafe. Moreover, where the velocity of a detected vehicle 100 exceeds a posted speed limit, the traffic control device may calculate deceleration necessary for the vehicle to stop prior to entering intersection 80. The traffic control device may be a traffic signal computer with specifically programmed software operating to send an RF signal, via direct current (DC) corresponding to an electromagnetic sensing loop, such as any of loops 120-128. The DC pertinent to the electromagnetic loop 120-128 may be a carrier wave for transmitting a braking signal. Accordingly, the electromagnetic loop 120-128 may emit the braking signal to vehicle 100.

Activation or initiation of the braking signal, such as a directed DC carrier wave resulting in an RF emission, may occur when specific criteria is met. For example, traffic control device 50 may include monitoring software, which may direct calculations and access relevant data applicable to the traffic control zone. Accordingly, the specific criteria may be met when control device 50 calculations pertinent to location and/or velocity of vehicle 100, as detected by any one or a combination of electromagnetic loops 120-128, are interpreted by device 50 to indicate an unsafe condition. For instance, the traffic control device 50 may sense and calculate that vehicle 100 is moving more quickly than typical similar vehicles would be moving at a similar moment under similar conditions to stop before entering intersection 80. Such interpretation may be assisted by data banks including associative traffic information pertinent to the specific traffic control zone 61 or similar traffic control zones. If the traffic control device 50 determines that specific criteria is met, for example if the vehicle 100 is calculated to be existent in an unsafe condition, braking signals may be initiated. Still further, criteria may be met if vehicle type is determined via particularized electromagnetic variance in the electromagnetic loop as the vehicle electromagnetically interacts with the loop, wherein the specifically typed vehicle is moving too quickly for type.

Specific criteria may vary based on individual topographical, geographical and/or traffic flow characteristics pertaining to a traffic control zone, such as zone 61 at particular times. For example, a zone on a hill in a rural area at night may have different specific criteria than a zone in a city block during rush hour. Moreover, specific criteria relative to the initiation of braking signals may vary depending on control zone objectives. For example, some control zones may have as an objective, merely the slowing of traffic as opposed to the stopping of traffic. For instance, a construction zone, a school zone, an area near a shopping mall or sports venue, which may have high pedestrian traffic, may be a region of traffic flow where control of speed is of high priority. Accordingly, criteria may be met if a speed limit is determined to be exceeded. Furthermore, where it is desired to control speed, rather than actually stop a vehicle, an RF signal may be initiated by the traffic control device 50 and transmitted from electromagnetic loops located at measured intervals, such as equal distances or other intervals, within the zone. The interval placement of the loops may facilitate accurate measurement of vehicle speed as it moves within the zone. In addition, the measured intervals between loops may facilitate accurate calculations necessary to interpret when and/or which electromagnetic loops should emit a braking signal and for how long in order to facilitate slowing of a vehicle in an unsafe condition.

Specific criteria may also vary depending on whether and/or what traffic control directors a traffic control zone has. For example, when a traffic signal light, such as signal light 90, is green, the criteria for vehicle speed may be different than when the signal light 90 is yellow, or red. Moreover, the state of the signaling device, such as signal 90, may also effect criteria for braking signal initiation. For example, a blinking yellow light would likely have different criteria than a green turn arrow. Still further, the state of an additional signal 91, within or near the control zone 61, may also impact braking signal criteria. Additionally, common road signs, such as yield signs, stop signs, etc. located within or near a traffic control zone, may also vary criteria for braking signal initiation.

Figure 3:
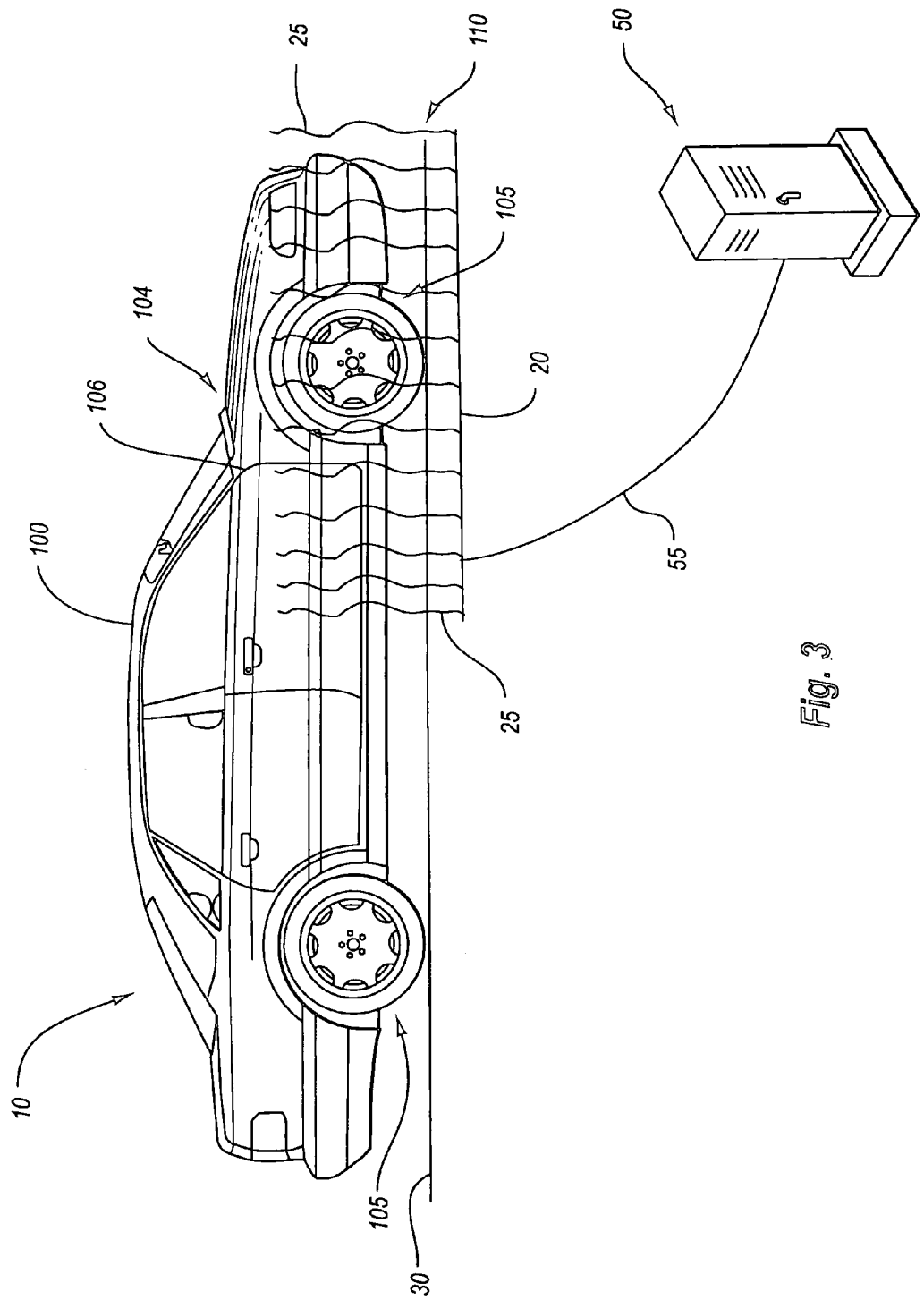
FIG. 3 depicts a side view of a portion of an embodiment of a vehicle braking system, in accordance with the present invention.

With further continued reference to the drawings, FIG. 3 depicts a side view of a portion of an embodiment of a vehicle braking system 10, in accordance with the present invention. The vehicle braking system 10 may include a braking apparatus 110 operably located on the vehicle 100. The braking apparatus 110 may include a receiver that receives braking signals 29 transmitted by the electromagnetic loop 20. Depiction of the signals 29, as being physically visible, is for illustrative purposes, as the signals 29 may be visually invisible. Moreover, the braking apparatus 110 may interprets the signals 29, as received, to facilitate remotely directed operation of a brake 105. The interpretation of the signals 29 may be accomplished by a processor, communicatively linked to the receiver, wherein the processor may include governing protocol executable for interpreting the signals 29 received by the receiver. The processor may be included in an electronic controlled braking module (ECBM) 104 configured to direct anti-lock braking. Furthermore, the receiver may be integrated with the ECBM. The brake 105 may be configured to operate as directed by the processor. For example, the brake, which may be physically and/or electrically connected to and operable with a receiver, may receive signals 29 emitted from loop 20 as directed by traffic control device 50 following a determination that vehicle 100 is in an unsafe condition relative to a traffic control zone.

Once the braking apparatus 110 of the vehicle 100 receives the braking signal 29, the processor within the ECBM 104 may operate the brake 105 as remotely directed by the signal 29 transmitted from loop 20 as initiated by traffic control device 50. The initiative for braking provided by control device 50 may be transferred or conveyed to loop 20 by communication line 55, depicted in dashed lines. The traffic control device 50 may correlate braking based on specific lanes of vehicle travel in relation to a traffic control zone. For example, if a vehicle, such as vehicle 100, is determined to be existent in an unsafe condition, the traffic control device 50 may initiate remote braking of the vehicle 100 through transmission of braking signals in the lane of travel corresponding to vehicle 100. However, if a separate vehicle, traveling concurrently in a separate lane is determined to be existent in a safe condition, then the traffic control device will not initiate remote braking associated with the safe vehicle. Hence, loops 20 positioned in the traffic lane corresponding to the unsafe vehicle 100 may emit braking signals 29 for the purpose of slowing the unsafe vehicle 100, while a separate vehicle may concurrently travel in a separate lane unaffected by the vehicle braking system 10. Furthermore, the vehicle braking system 10 may concurrently detect and determine safety conditions for multiple vehicles existent in multiple traffic lanes and engage braking for any and/or all vehicles detected. For instance, if a vehicle, such as vehicle 100 is following another vehicle and if the vehicle 100 is determined to be existent in an unsafe condition, then the vehicle braking system 10 may engage braking of the unsafe vehicle 100 while leaving unaffected the vehicle that is determined to be in a safe condition.

Moreover, the vehicle braking apparatus 110 may include a manual actuator 106, configured to operate a vehicle brake 105 and override remote braking directives. The manual actuator 106 may be a common brake pedal or any other implement effective for manually operating the brake 105 or brakes of a vehicle, such as vehicle 100. The manual actuator 106 may be communicatively linked to the processor such that manual actuation of the brake is communicated to the processor and interpreted to stop braking directives remotely initiated by received signals 29 interpreted by the processor. For example, the ECBM may be communicatively linked to the brake pedal, such that when the pedal is depressed the ECBM directs the manual operation of the brakes to override any remotely initiated vehicle braking. If the manual actuator is disengaged, for instance, if a vehicle operator lets off of the brake pedal, then remotely initiated vehicle braking may resume if the vehicle is determined again, by the traffic control device 50, to be existent in an unsafe condition. Still further, resumed remotely initiated vehicle braking may be overridden if the manual actuator 106, such as a brake pedal, is engaged again. Even further still, manual actuation of a vehicle brake may be configured to work in conjunction with remotely initiated braking. For example, if a vehicle brake is manually activated, but a vehicle is still determined to be unsafe, provisions may be made to ensure the unsafe vehicle slows or stops if manual braking is terminate prematurely.

For reasons of safety and efficiency, a vehicle braking system 10 may involve employing a secured operation to override remote braking initiatives, wherein the secured operation may correspond to an emergency vehicle. For example, an ambulance moving quickly through traffic in an emergency situation may send a secured signal to a traffic control device 50 prompting the device 50 to forestall remote initiation of vehicle braking pertaining to the ambulance. Moreover, the traffic control device may substantially alter traffic control directives pertinent to the traffic control zone. For example, a fire engine may employ a strobe light to indicate to a traffic control device the approach of the fire engine to an intersection. In response to the strobe signal, the traffic control device may turn all traffic signals to red, or yellow and then red if the light was previously green. Thus the entire intersection may be directed to be in as stopped traffic condition when the fire engine encounters the intersection. In addition, the traffic control device 50 may initiate remote braking of all vehicles within the traffic control zone 60, to reduce the speed and/or stop all vehicles in the zone 60 before the fire engine enters the intersection.

The vehicle braking system 10 may also include employing a warning or alert provided within a vehicle, such as vehicle 100, if the vehicle is determined to be in an unsafe condition. The warning or alert may occur prior to, concurrently with, or after remotely initiated vehicle braking. Moreover, the warning or alert may be visually, audibly or tactilely employed. For example, a vehicle may include a light, speaker of vibrating element that may in some manner alert or indicate to a vehicle operator that the vehicle has been determined to be in an unsafe condition. The alert may persist until the vehicle is determined to be in a safe condition or until remotely initiated braking is manually overridden.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

I claim:

1. A vehicle braking method comprising:
   establishing compliant criteria for the position and velocity of a vehicle approaching an intersection controlled by a traffic light, wherein the traffic light is capable of indicating various statuses, and the compliant criteria vary based upon the status of the traffic light;
   providing a plurality of electromagnetic loops, wherein the plurality of electromagnetic loops are located on or under a roadway near the intersection controlled by the traffic light;
   detecting a vehicle approaching the intersection, wherein the vehicle is detected via electromagnetic variance in at least one of the electromagnetic loops as the vehicle electromagnetically interacts with the at least one of the electromagnetic loops;
   providing an automated traffic control device linked to each electromagnetic loop of the plurality of electromagnetic loops and to the traffic light, wherein the automated traffic control device is configured to calculate the position and velocity of the detected vehicle in relation to the current status of the traffic light and to determine whether the condition of the vehicle, as detected in relation to the current status of the traffic light, is safely within the established compliant criteria for the current status of the traffic light;
   transmitting braking control signals from at least one of the electromagnetic loops, wherein the braking control signals are initiated by the automated traffic control device if the condition of the vehicle is determined to be unsafe in relation to the compliant criteria established for the current status of the traffic light; and
   receiving the control signals, by the vehicle, to remotely initiate braking of the vehicle so that the vehicle decelerates predictably in relation to the current status of the traffic light.

2. The vehicle braking method of claim 1, further comprising correlating braking based on specific lanes of vehicle travel in relation to a traffic light.

3. The vehicle braking method of claim 1, further comprising employing a secured operation to override remote braking initiatives, wherein the secured operation corresponds to an emergency vehicle.

4. The vehicle braking method of claim 1, wherein determining whether the condition of the vehicle, as detected in relation to the status of the traffic light, is safe includes consideration of vehicle type.

5. The vehicle braking method of claim 4, further comprising overriding remotely initiated braking via operation of a manual braking actuator located on the vehicle.

6. The vehicle braking method of claim 1, wherein the traffic control device includes monitoring software directing calculations and accessing relevant data applicable to the traffic light, such that when a specific criteria is met braking signals are initiated.

7. The vehicle braking method of claim 1, further including providing multiple electromagnetic loops independently linked to the traffic control device, each loop configured to detect a vehicle and transmit signals to a vehicle by emitting braking signals to the vehicle via a direct current carrier wave resulting from a radio frequency emission sent from the traffic control device.

8. The vehicle braking method of claim 1, wherein the multiple electromagnetic loops are positioned sequentially closer to one another as the distance to a desired slowing or stopping point is approached.

9. The vehicle braking method of claim 8, wherein braking signals transmitted from the electronic loops vary based on vehicle condition as determined by the traffic control device, and further wherein the varied signals remotely control braking differently based on vehicle condition.

10. A vehicle braking method comprising:
    providing a traffic light at an intersection, the traffic light capable of signaling a traffic command to a driver of a vehicle approaching the intersection;

establishing, for each traffic command capable of being signaled by the traffic light, a range of compliant values for the position and velocity of the vehicle approaching the intersection;

providing a plurality of electromagnetic loops, wherein the plurality of electromagnetic loops are located on or under a roadway and substantially near the traffic light and the intersection, such that vehicles approaching the traffic light and the intersection are necessarily configured to pass over the electromagnetic loops;

detecting a vehicle approaching the traffic light and the intersection, wherein the vehicle is detected by electromagnetic variance in at least one of the electromagnetic loops as the vehicle electromagnetically interacts with the at least one of the electromagnetic loops while passing over the at least one electromagnetic loop;

providing an automated traffic control device linked to both the electromagnetic loops and the traffic light, wherein the automated traffic control device is configured to calculate the position and velocity of the detected vehicle;

determining whether the position and velocity of the detected vehicle are within the range of compliant values established for the traffic command signaled by the traffic light, wherein the determination is made by the automated traffic control device; and transmitting braking control signals from at least one of the electromagnetic loops to the detected vehicle, wherein the braking control signals are initiated by the automated traffic control device if the automated traffic control device determines that the position or velocity of the detected vehicle is not within the range of compliant values established for the traffic command signaled by the traffic light.

11. The method of claim 10, wherein the traffic command may be one of a green light, a yellow light, a blinking yellow light, a red light, and a blinking red light.

12. The method of claim 10, wherein the range of compliant values is established based on any combination of vehicle size, vehicle type, intersection layout, topographical characteristics, geographical characteristics, traffic flow characteristics, time of day, and pedestrian activity.

* * * * *